(12) United States Patent
Neddermeyer et al.

(10) Patent No.: US 12,516,923 B2
(45) Date of Patent: Jan. 6, 2026

(54) METHOD FOR ASSESSING A DEPRESSION, IN PARTICULAR A BORE, IN A WORKPIECE

(71) Applicant: 3D.aero GmbH, Hamburg (DE)

(72) Inventors: Werner Neddermeyer, Echternach (LU); Tim Harms, Hamburg (DE); Sönke Bahr, Darmstadt (DE); Tobias Flüh, Rabenkirchen-Faulück (DE); Tomas Domaschke, Hamburg (DE)

(73) Assignee: 3D.aero GmbH (DE)

( * ) Notice: Subject to any disclaimer, the term of this patent is extended or adjusted under 35 U.S.C. 154(b) by 231 days.

(21) Appl. No.: 18/465,590

(22) Filed: Sep. 12, 2023

(65) Prior Publication Data
US 2024/0085170 A1   Mar. 14, 2024

(30) Foreign Application Priority Data

Sep. 12, 2022  (EP) ..................................... 22195050

(51) Int. Cl.
*G01B 11/02* (2006.01)
*G01B 11/12* (2006.01)
*G01N 21/954* (2006.01)

(52) U.S. Cl.
CPC ............ *G01B 11/026* (2013.01); *G01B 11/12* (2013.01); *G01N 21/954* (2013.01); *G01N 2201/0636* (2013.01)

(58) Field of Classification Search
CPC .... G01B 11/026; G01B 11/12; G01B 9/0209; G01B 11/303; G01B 11/2441; G01B 9/02021; G01N 21/954; G01N 2201/0636
See application file for complete search history.

(56) References Cited

U.S. PATENT DOCUMENTS

| | | | | |
|---|---|---|---|---|
| 4,055,382 A | * | 10/1977 | Ziekman | G01N 21/954 250/559.49 |
| 4,326,808 A | * | 4/1982 | Pryor | G01N 21/954 250/559.46 |

(Continued)

FOREIGN PATENT DOCUMENTS

| | | | |
|---|---|---|---|
| DE | 19806279 A1 | * 12/1998 | ........... G01N 21/954 |
| DE | 10204136 A1 | 8/2003 | |

(Continued)

*Primary Examiner* — Mohamed K Amara
(74) *Attorney, Agent, or Firm* — Sand, Sebolt & Wernow Co., LPA

(57) ABSTRACT

A method for assessing a wall of a depression, particularly a bore, in a workpiece. The method requires that a light beam in the depression is deflected so that at least two regions of the at least one wall portion are illuminated, and in that, by means of the at least two regions, reflected light is guided along the first axis out of the depression and is used outside the depression for determining the geometry and/or reflectivity of the at least one wall portion. The determination of the geometry or reflectivity is carried out interferometrically and/or wherein in each region for at least 250 pixels, at least one distance value and/or at least one intensity and/or reflectivity value is detected, and/or wherein the regions and/or the at least one light beam each has an area of at least 0.1 mm².

15 Claims, 2 Drawing Sheets

(56) References Cited

U.S. PATENT DOCUMENTS

Figure 1:
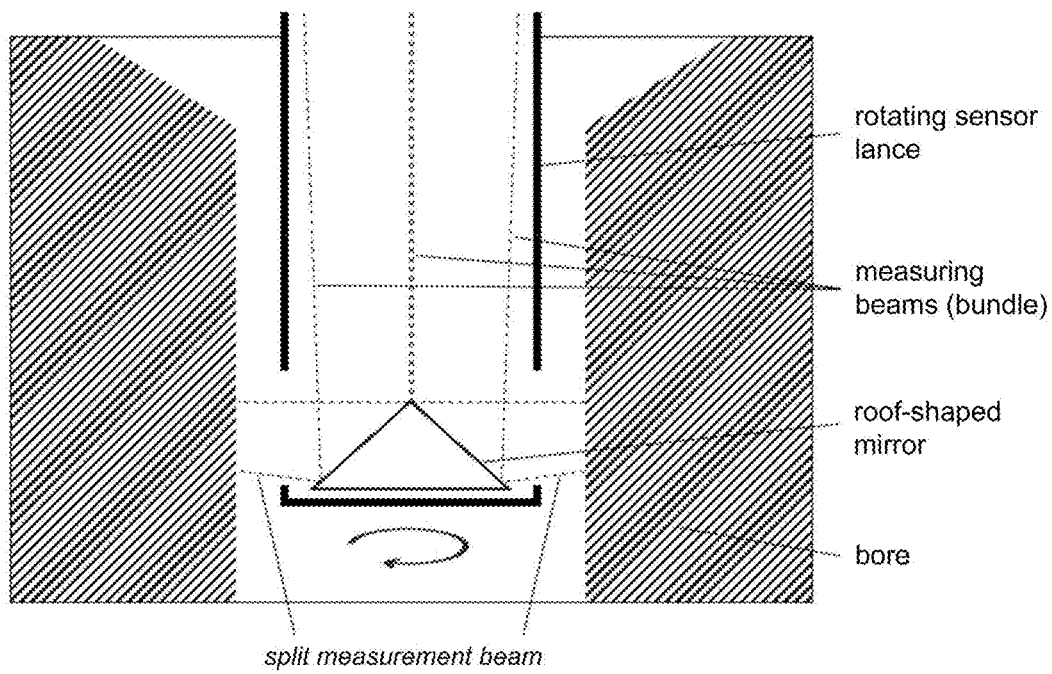

| | | | | |
|---|---|---|---|---|
| 4,453,082 | A | * | 6/1984 | Pryor .................... G01B 11/007 |
| | | | | 250/559.07 |
| 4,465,374 | A | * | 8/1984 | Pryor .................... G01N 21/954 |
| | | | | 356/635 |
| 5,825,017 | A | * | 10/1998 | Pryor ........................ F02F 1/24 |
| | | | | 250/559.08 |
| 6,134,003 | A | * | 10/2000 | Tearney ............. G01N 21/4795 |
| | | | | 356/497 |
| 8,194,251 | B2 | | 6/2012 | Entman et al. |
| 9,982,994 | B2 | * | 5/2018 | Schönleber ............ G01B 11/14 |
| 10,352,693 | B2 | * | 7/2019 | Abovitz .............. G06F 3/04883 |
| 2004/0179203 | A1 | * | 9/2004 | Straehle ............. G01B 9/02064 |
| | | | | 356/497 |
| 2006/0256347 | A1 | * | 11/2006 | Lindner ............... G01B 11/303 |
| | | | | 356/497 |
| 2008/0174785 | A1 | * | 7/2008 | Seitz .................. G01B 9/02028 |
| | | | | 356/516 |
| 2012/0140243 | A1 | | 6/2012 | Colonna de Lega |
| 2014/0043610 | A1 | * | 2/2014 | Engel .................... G01B 11/245 |
| | | | | 356/369 |
| 2015/0159998 | A1 | | 6/2015 | Altendorf |

FOREIGN PATENT DOCUMENTS

| | | | | |
|---|---|---|---|---|
| DE | 10301607 | A1 | | 8/2004 |
| DE | 102004045808 | A1 | | 4/2006 |
| DE | 102013003640 | A1 | | 9/2014 |
| DE | 102014215931 | A1 * | 3/2016 | ......... G01B 11/2425 |
| DE | 102014218974 | A1 * | 3/2016 | ............ G01B 11/12 |
| DE | 112014006706 | B4 | | 9/2020 |
| DE | 102021131492 | A1 * | 6/2023 | .......... G01N 21/909 |
| WO | 2005121700 | A1 | | 12/2005 |
| WO | WO-2015180755 | A1 * | 12/2015 | ............. G01B 11/12 |

* cited by examiner

METHOD FOR ASSESSING A DEPRESSION, IN PARTICULAR A BORE, IN A WORKPIECE

The present invention relates to methods for assessing a wall of a depression in a workpiece. This is used, for example, in the aviation and/or automotive industries. In particular, the invention relates to a method for automatically testing bores.

The previous established methods are not satisfactory due to their low accuracy, flexibility, robustness, and lack of repeatability.

Thus, in the prior art there are already various approaches to determine the quality of a bore of workpiece surfaces performed. One of the most widely used methods is still the visual inspection by means of a magnifying glass or a pocket microscope. Typical magnifications lie in the range of 10 fold to 30 fold. In this case, a worker estimates the quality of the bore based on their experience and compared to reference samples.

Until now, compliance with the correct diameter tolerance range of the bores is usually ensured manually with a limit mandrel. Even in the case of multi-layer materials, only one limit mandrel is used. A mobile, hand-guided roughness measuring device is frequently used to determine the surface roughness. A measurement along the bore axis is thus carried out at a random point in the bore. In the event that the measurement extends along a larger scratch that might severely distort the measurement result, several measurements are carried out at different positions. In this case, a visual inspection by means of magnifying glass is conducted subsequently in order to identify the cause of the deviation and to evaluate the quality of the bore through a view into the interior. Based on this part subject to a subjective action, it is finally decided whether the component is used or declared as waste. However, this procedure is hardly or not at all repeatable.

Optical measuring systems with a rotating measuring probe are also occasionally used, which are immersed in the bore. Thus, three-dimensional images (point clouds) of the bore wall can be generated. These systems all measure the one-sided distance of the bore wall from the lance (point measurement), while the latter rotates continuously and is moved along the bore axis. The result is a spiral-shaped three-dimensional point cloud, on the basis of which the desired properties are subsequently investigated. However, these systems do not provide the results with the necessary accuracy and stability. In addition, these systems are not designed for mobile usage.

Such a system with rotating lance measuring on one side is known, for example, from WO 2005/121700 A1 and/or the boreCONTROL from Micro-Epsilon with an additional external linear axis, which scans holes contactlessly by means of a confocal chromatic measuring beam. Another example system with rotating lance measuring one side is the BOREINSPECT system from Novacam. This uses the principle of short-coherence interferometry for contactless scanning of inner bore walls.

In addition, U.S. Pat. No. 8,194,251 B2 discloses a CPS method with a lance which enables two chromatic point removal measurements at the same time and diametrically opposite. The measurements lie in different planes perpendicular to the lance.

US 2015/0159998 A1 also discloses a CPS method with a lance which enables three chromatic point distance measurements in one plane.

DE 11 2014 006 706 B4 discloses an examination arrangement for boreholes, in which a circumferential line of the borehole is illuminated from a point-shaped light source and the reflected light is imaged onto a circular detector area.

From US 2012/0140243 A1 it is known to search for a reflective surface by moving a focal plane under illumination with structured light.

DE 10 2004 045 808 A1 also discloses the measurement of a borehole wall and a cone in the borehole without moving the lens, in particular at separate times, whereby care must be taken to avoid any overlap.

Previous methods for automated testing usually use linear or spiral measurements of individual points of the surface. The measurement of only a few points simultaneously poses very high demands on the accuracy of the movement of the lance for the complete measurement of a wall. The values obtained from a plurality of rotation and translation steps provide only an inaccurate overall image. In addition, diameters or distances between two walls can be determined only indirectly and thus inaccurately. For these reasons, roughness measurements are usually not possible.

The use of a limit leveling mandrel only makes it possible to check whether the bore is in the predetermined tolerance range. This statement can also be made only for the borehole as a whole. A distinction between different layers is not possible.

In the roughness measurement by means of a hand-guided, tactile measuring device, it is hardly ensured that the measurement path is limited to certain regions or individual material layers in a targeted manner. If the measurement path extends over different layers whose surfaces are differently pronounced by the drilling process, the measurement result is not meaningful. The accuracy of the results of the hand-held measuring device can also be influenced by individual factors such as, for example, experience when handling the device. If a visual check occurs at the conclusion, this decision may also be subjectively affected. In addition, the visual inspection is greatly made more difficult due to the fact that, for example, a magnifying glass has to be placed into the bore from the outside. It is not possible to inspect narrow and deeper holes over the entire depth over the entire depth and accurately inspect them in a repeatable manner. Furthermore, documentation of the properties and possible defects is also not satisfactorily possible.

The systems with one-sided measuring and rotating sensor lance also have a disadvantage. An ideal concentricity of such a lance is not ensured by manufacturing tolerances, environmental influences, and use. This results in the problem of these one-sided measuring systems. The wobbling and the tilting of the lance in a bore influence the distance between the measuring optics and the bore wall. This unwanted deviation is directly included the measurement result and distorts it. Since this deviation cannot be quantified due to the single-sided point measurement, the error which enters into the distance measurement by the wobbling of the axis cannot be determined. An exact measurement of the diameter is thus not possible.

For this purpose, the invention proposes a method, a device and a use, as well as advantageous further developments.

The method according to the invention for examining and/or measuring at least one wall section of a depression, in particular a depression and/or a bore, introduced into a workpiece by means of an optical measuring method, requires the introduction of at least one light beam into the depression along a first axis, wherein the geometry and/or reflectivity of the at least one wall section is measured by means of the at least one light beam, wherein the at least one light beam is deflected in the depression in such a manner that at least two regions of the at least one wall section, in particular diametrically opposite each other in the depression, are respectively illuminated, and in that the at least two regions are each used to guide reflected light along the first axis out of the depression and is used outside the depression for determining the geometry and/or reflectivity of the at least one wall portion, characterized in that the determination of the geometry and/or reflectivity takes place interferometrically and/or in each region for at least 25 pixels, in particular simultaneously, at least one distance value and/or at least one intensity and/or reflectivity value is detected, and/or the regions and/or the at least one light beam each have an area of at least 0.1 mm².

The device according to the invention for examining and/or measuring at least one wall portion of a depression, in particular a recess and/or a bore, introduced into a workpiece by means of an optical measurement method is configured to introduce at least one light beam through a lance, in particular from a first portion of the lance, along the longitudinal extension of the lance into the depression, wherein the device is designed to measure the geometry and/or reflectivity of the at least one wall portion by means of the at least one light beam, wherein the device is configured to rotate the lance about the longitudinal extent of the lance and/or to move the lance along the longitudinal extension of the lance, characterized in that the lance, in particular at a distance from the first portion, has at least one beam splitter, which is arranged and configured to deflect the at least one light beam in such a way that it exits in a plurality of adjacent planes perpendicular to the longitudinal extension of the lance, in particular radially, from the lance, at at least two circumferential areas of the lance that are distanced from one another, in particular diametrally opposed to each other, and that the device is designed to deflect light exited and reflected through the lance at each of the at least two areas, in particular to the first section and/or along the longitudinal extension of the lance and out of the lance, and to use it outside the lance for determining the geometry and/or reflectivity of the at least one wall portion, wherein the device is configured to detect at least one distance value and/or at least one intensity and/or reflectivity value, in particular simultaneously, via each of the at least two circumferential regions for at least 25 pixels, and/or wherein the at least two circumferential regions each have a surface of at least 0.1 mm² and/or wherein the device is configured to determine the geometry and/or reflectivity interferometrically.

The object is also achieved by using a beam splitter, in particular a reflection beam splitter, in particular an arrangement of at least two mirrors, for examining and/or measuring at least one wall section of a depression introduced into a workpiece, in particular a recess and/or bore, by means of an optical, in particular interferometric, measurement method, wherein the beam splitter is configured to divide an incident light beam into at least two beams, which in particular enclose an angle of 180° and, in particular immediately after the beam splitter, have in each case, a cross-sectional area of at least 1 mm².

By recording overlapping regions, whereby the lance does not have to be moved to record a region, large wall sections can be measured very precisely. The images of the regions are consistent. Due to the overlap, they can be mathematically accurately assembled into a large image/data set, which then also allows the determination of roughness or roughness gradients and borehole geometries with great precision.

The device has and the method uses, in particular, optics that can be arranged partially or completely in the lance in order to image pixels of a sensor array, for example a CCD, onto the regions and/or the borehole wall. Depending on the size of the pixels used and their distance in the sensor array as well as the optics used and also depending on the borehole diameter or the distance of the lance from the borehole wall and/or the respective region, different sized regions of the borehole wall and/or the respective region are/is mapped onto a pixel of the sensor array. The distance and size of the pixels do not have to be the same across the area of the sensor array. As a rule, however, they are largely the same and homogeneously distributed. The distance between the pixel centers mapped to the borehole wall and/or a region can also be referred to as resolution. The device is in particular designed in such a way, the method is carried out in such a way and/or the use is such that at least five pixels lying next to one another in the direction of the longitudinal extension of the lance and/or in the direction of the first axis are detected for each circumferential region. The pixels recorded along the longitudinal extent of the lance on the circumferential region of the lance in particular span at least 0.1 μm. The device is in particular designed to detect at least five pixels in the direction of the longitudinal extension of the axis for each pixel detected next to one another in the circumferential direction.

In particular, the device is set up, the method is carried out in this way and/or the use is one of successively measuring a large number of overlapping regions, in particular mapping them onto the pixels and determining their geometry and/or reflectivity interferometrically and in particular to compile geometry and/or reflectivity of the overlapping regions into a data set in which the geometry and/or reflectivity of the at least one drill hole circumference section covered by the overlapping regions are contained, in particular in such a way that the data of the overlapping regions is consolidated and/or geometry and/or reflectivity data for a, in particular in at least one, advantageously two, direction/coordinates homogeneous, grid.

The method is advantageously carried out in such a way, the use is such and/or the device is set up to carry out the examination and/or measurement of the at least one wall section by examining and/or measuring a plurality of overlapping regions of the at least one wall section. With particular advantage, the regions are each completely illuminated by the light beam at a time each and/or the surfaces of the wall sections covered by at least two regions are illuminated, examined and/or measured at least twice in succession, and in particular a data set of the examination and/or measurement of at least one wall section is generated. The device is advantageously set up accordingly and in particular has a control set up to effect this.

In particular, the device is designed for carrying out the method and/or the use and/or the method and/or the use is carried out with the device. The device is also preferably furnished to execute the method as described in the following.

The at least one wall section can in particular be a single continuous wall section. This can in particular be covered or formed by a plurality of regions which adjoin one another and, in particular, adjoin one another in an overlapping manner.

As a result, a holistic image of the wall can be obtained. However, a plurality of mutually separate wall sections, for example two diametrically opposed strips, can also be detected. This can be particularly preferred if a simple process control is desired, for example without rotation of the first axis or lance.

The use of a single light beam, in particular an interferometer, in particular white light interferometer, is preferred. However, this can also be split or become divided during the course along the first axis. A plurality of light beams, in particular light beams running parallel along the first axis, can also be used.

The at least one light beam extends in particular such that it encloses the first axis centrally, but in any case preferably parallel to the first axis. It preferably runs within a hollow lance, i.e. in particular in a tube. It extends in particular over a length in the range from 10 to 500 mm, in particular at most 300 mm, along the axis or in the lance.

Particularly advantageously, the regions are diametrically opposed and/or at least one connecting line between two simultaneously illuminated regions extends through the first axis, the longitudinal axis of the lance and/or the central axis of the depression. For example, two diametrically arranged regions can be used. However, the use of several regions or divided light beams is also possible. In this case, these are arranged in particular in such a way that a connecting line between two simultaneously illuminated regions and/or the exit surfaces of the light beams from the lance extends through the first axis, the longitudinal axis of the lance and/or the central axis of the depression, wherein the connecting line is selected in particular in such a way that light emerges from the lance along the line extended in both directions.

The reflected light, in particular the proportion of the light reflected at the wall, which is reflected back to the beam splitter again, in particular parallel to the exiting light, is guided back along the first axis or in the lance and fed to an evaluation unit. The device is designed in particular for this purpose.

The geometry of the wall and/or its reflectivity can be determined on the basis of the reflected light guided along the first axis. This takes place in particular interferometrically. This offers the advantage of determining a planar and not only punctiform test for a certain position of the beam splitter or the lance to determine and reflectivity and geometry in a measuring method. Thus, the reflected beam can be superimposed with a reference beam and recorded with a light-sensitive sensor array after passing through different path lengths. For this purpose, for example, the sensor array or a mirror can be designed to be movable in order to realize different path lengths. The sensor array then results in an intensity distribution dependent on the path length for each pixel of the sensor array. The geometry of the wall and the intensity of the maximum can be determined from the position of the maximum of the intensity peak. For this purpose, a sensor with a checkerboard-like arrangement of pixels can be used, for example. If light reflected by the at least two regions is imaged onto the sensor array and the maximum of the intensity is determined for each pixel, a flat region with respect to the geometry and or reflectivity can be measured without changing the regions or the beam splitter or the lance.

In particular, at least 200 and/or at most 1000 values per pixel for different path lengths are read for each time-consuming/illuminated regions, and in particular the path length with maximum illumination intensity of the pixel and/or the maximum illumination intensity of the pixel are determined.

A calibration can advantageously be carried out by means of a depression with a known geometry or by means of a known measurement path, for example between two parallel walls with a known distance and/or a reference bore having a known diameter.

The use of white light in interferometry is particularly advantageous, since a particularly accurate determination of the maxima is thereby possible.

Advantageously, at least 25 pixels are recorded in each region, i.e., for at least 25 pixels each, the maximum of the intensity with respect to the required path length and/or the amplitude or a distance and/or an intensity or reflectivity value is determined. In this case, an arrangement of at least 5 pixels in one and at least 5 pixels in another direction, in particular perpendicular to the region or its projection onto a plane, is advantageously recorded for each region. One direction corresponds in particular to that of the longitudinal axis of the borehole and/or the longitudinal extension of the lance and/or the other to that of the circumference of the borehole in the region and/or its projection onto a plane. The plane is in particular a plane parallel to a tangential plane on the region or its averaging and/or a plane parallel to the longitudinal extent of the lance and/or the borehole and/or to the average direction of incidence of the light on the region. As a result, the local geometry can be detected to a certain degree, which makes it possible to determine the distance of the opposite walls and/or to have a sufficient overlap in order to obtain a continuous image through several regions. Significantly higher pixel numbers of at least 1000 are, however, preferred for a fast and detailed as well as accurate examination.

In particular, the pixels, in particular on the region, and/or the points on the region that correspond/are imaged to the pixels and/or the points on the region that are imaged onto the pixels of a detector, have a 2- or 3-dimensional arrangement and/or they are distributed in two directions and/or uniformly and/or in two, in particular mutually perpendicular, in two directions with a ratio in the range from 1:10 to 10:1 pixels. The device is in particular designed and/or the method is carried out in such a way that in the direction of the longitudinal extent of the lance and/or the borehole at least 5 pixels per pixel in the circumferential direction and/or perpendicular to the longitudinal extent are recorded over the region or its projection onto a plane in which the first axis is located.

Advantageously, at least 0.1 mm$^2$ are recorded and/or illuminated in each region and/or each of the light beams exiting the lance has a cross-sectional area of at least 0.1 mm$^2$. As a result, the local geometry can be detected to a certain degree, which makes it possible to determine the distance of the opposite walls and/or to have a sufficient overlap in order to obtain a continuous image through several regions. Significantly larger areas of at least 1 mm$^2$ however, are preferred for a fast and accurate examination.

Particularly preferably, the points corresponding to the pixels on the wall or in the light beam when passing through the lance circumference have a distance in the range from 1 to 500 µm, in particular in the range from 10 to 50 µm. This can be realized by using appropriate optics.

Advantageously, the regions are jointly rotated about the first axis or longitudinal extension and moved along the first axis or longitudinal direction. In this case, the method is first carried out for a first region quantity comprising at least two regions, then a rotation and/or, in particular exclusive or, translation, is carried out and then the method for a second region quantity comprising at least two regions is carried out, etc. until the method has been carried out for a plurality, in particular at least six, of region quantities. The device is advantageously configured for such a procedure. In this case, the regions of the region quantities are selected such that in each case a region of a region quantity has an overlap with a region quantity following it, in particular immediately following it. In particular, the range amounts are selected such that all regions apart from the edge-dependent limits of the quantity of all the region quantities have overlaps with at least one region of the plurality of region quantities in each case. Thus, a planar and uninterrupted overall image of the wall section covered by the regions can be achieved.

Preferably, the regions each have an area in the range of at least 2 $mm^2$ and/or up to a maximum of 50 $mm^2$, in particular in the range from 3 to 10 $mm^2$.

The regions preferably have an extension of at least 0.1 mm, in particular at least 0.3 mm, in one direction and of at least 0.1 mm, in particular at least 0.3 mm in another, particularly orthogonal, direction in particular in the region or its projection on a plane vertical the first axis. One direction corresponds in particular to that of the longitudinal axis of the borehole and/or that of the longitudinal extension of the lance and/or the other to that of the circumference of the borehole in the area and/or its projection onto a plane. The plane is in particular a plane parallel to a tangential plane on the area or its average and/or a plane parallel to the longitudinal extent of the lance and/or the drill hole and/or to the average direction of incidence of the light on the region. This has been shown to be advantageous for a particularly efficient and precise process control.

Advantageously, the determination of the distance values and/or intensity and/or reflection values of the simultaneously illuminated areas, that is to say in particular the pixels onto which the simultaneously illuminated areas are imaged, takes place without traversing or rotating the first axis or the lance and/or without changing the illumination of the at least one wall section. In this manner, a particularly high degree of accuracy can be achieved.

Preferably, the regions illuminated simultaneously in each case each intersect a common plane perpendicular to the first axis, in particular they intersect the same planes perpendicular to the first axis. As a result, in particular in that the regions or exit surfaces of the light beams from the lance lie on the same regions of the longitudinal extension of the lance or intersect the same planes perpendicular to the first axis, a particularly accurate measurement, for example of the diameter, of a bore is possible, in particular if the first axis and/or longitudinal extension of the lance is arranged parallel but not necessarily along the longitudinal extension of the bore. Such an arrangement can also be achieved due to the measurement by means of the method. Thus, first a plurality of regions can be measured at different depth of the hole and, on the basis of which a tilting of the first axis or the lance to the longitudinal axis of the hole can be determined, and if necessary the position of the first axis or lance can be corrected accordingly.

Advantageously, the at least one wall section has a size in the range of at least 25 $mm^2$ and/or maximum 100 $cm^2$. As a result, a load-bearing assessment of a depression, in particular drilling and/or milled, is achieved that is abstracted by local deviations.

The depression preferably has a size and/or a diameter in the range from 4 to 25 mm and/or the depression and/or the at least one wall section has a depth, in particular in the direction of the first axis and/or the longitudinal extension of the lance in the range of at least 2 mm and/or at most 0.5 m. As a result, a load-bearing assessment of a depression, in particular drilling and/or milled, is achieved that is abstracted by local deviations.

Advantageously, the method is carried out in such a way that, per area, at least 1000 pixels and/or at most 50,000 pixels are detected, in particular simultaneously, wherein the pixels, in particular on the region, and/or the points that are assigned to the pixels on the region by imaging and/or the points on the region that are imaged image onto the pixels of a detector, have a 2- or 3-dimensional arrangement and/or are uniformly distributed over the region or its projection onto a plane in which the first axis lies.

The method according to any one of the preceding claims, wherein a material type, roughness, and/or color derived from the reflectivity and/or at least one material type and/or color difference and/or at least one boundary is detected based on different reflectivity values.

Preferably, regarding adjoining regions, in particular all regions adjoining one another, in particular at least 3 pixels, preferably at least 20 pixels, and/or by at least the extent of the image of three pixels and/or three times the resolution, in particular by at least 0.5 µm, overlap towards an, in particular all, adjoining region(s), in particular on at least 3, preferably at least 4 edges, and/or in at least 3, preferably 4 directions, to adjacent areas, for at least 3 pixels, in particular at least 20 pixels. It is particularly preferred if the intensity and/or reflection images of the overlapping regions are assembled to form a coherent reflection image and/or the geometries of the overlapping region are combined to form a cohesive geometry.

All regions preferably border on at least one other region, in particular the majority of the regions border on at least three, preferably 4 regions. Preferably, all regions, in particular the majority of regions and/or all regions, border on at least one region in at least two mutually perpendicular directions, in particular on at least one region in each direction. This enables consistent and accurate imaging of large areas or sections of holes.

The regions of the at least one wall section illuminated simultaneously are advantageously disjoint with one another and/or they have a distance of at least one third of the circumference of the wall and/or the extension of the wall in the plane perpendicular to the first axis/longitudinal extension.

Particularly preferably, the deflection is carried out by a beam splitter, in particular formed by at least two mirrors, and/or by means of a beam splitter reflected light is guided along the first axis out of the depression along the first axis.

An arrangement of two mirrors in the form of a gabled roof can be used as a beam splitter, for example. These can be formed, for example, by reflective coating of a correspondingly shaped glass body, in particular a triangular glass body, in particular the same cross section, which is in particular the same as a solid body without a hollow space. This has proven to be particularly robust. In this case, the light beam running along the first axis or in the lance impinges from above on the first and the reflecting surfaces, in particular symmetrically, and is divided and deflected. The beam splitter is in particular designed to be reflective.

The beam splitter can preferably have a plurality, in particular a plurality of two to eight, planar reflective surfaces, which in particular each have an angle with respect to one another and/or each had a continuous planar surface. In particular, a planar specular surface is provided per region and/or per peripheral region at which a beam exits from the lance. In this case, the beam splitter is formed in particular by at least one, in particular exactly one, glass body with mirror-coated surfaces.

However, the beam splitter can also be designed to transmit and/or be refractive. The beam splitter can also be designed as a beam splitter field, that is to say can be formed by a plurality of elements which in total lead to a corresponding division and deflection.

Advantageously, the movement along the first axis/lance longitudinal extension is rotated and/or rotated about the first axis/longitudinal extension and thus different regions in the depression are illuminated by the at least one light beam.

Particularly advantageously, the beam splitter is introduced into the recess along the first axis/longitudinal extension, in particular translationally.

Preferably based on the determined geometry of the at least one wall section, a centering of the first axis/lance longitudinal extension in the recess is brought about, in particular by means of a displacement and/or tilting device for moving and/or tilting the first axis/lance in a plane perpendicular to the first axis/lance longitudinal extension and/or tilting of the first axis/lance and in particular subsequently the measuring of the geometry and/or reflexivity of one region or of the at least one wall section is effected according to the invention.

Particularly advantageously, the position and/or orientation of the first axis and/or of the at least one region, a lance on which the beam splitter is fixed and/or the beam splitter, in particular relative to the workpiece, is detected. As a result, they can bring the acquired measured values into relationship with the workpiece and also check the position and orientation of the recess.

Advantageously, in a method proposed here, the geometry of the wall is recorded spatially resolved by means of an optical measuring method. Ideally, this occurs with a high resolution. In particular, the resolution should be selected such that the lateral resolution and/or the resolution parallel to a plane in which the first axis and/or the longitudinal extension of the lance is greater than 50 µm, in particular better than 25 µm, in particular in the range of 5 µm to 15 µm.

In particular, the resolution should be selected such that the resolution perpendicular to the first axis and/or longitudinal extension of the lance and/or the resolution is better parallel to a plane in which the first axis and/or lance is located than 75 µm, in particular better than 50 µm, in particular in the range of 10 µm to 50 µm.

Such resolutions can be realized, for example, by means of interferometry, in particular WLI, and corresponding optics.

Furthermore, the detected geometry and/or reflectivity can be compared with a desired geometry and/or target reflection expected for the depression and a deviation can be determined. The expected desired geometry and/or desired reflectivity can be derived, for example, from a construction model of the workpiece and in particular the material properties.

The evaluation described above is typically carried out in a computer-assisted manner, using a software that performs the evaluation. This can then, in particular, also archive the evaluation results, possibly together with the raw data, e. g., the detected geometry, to the workpiece, equally as a type of quality as.

Figure 2:
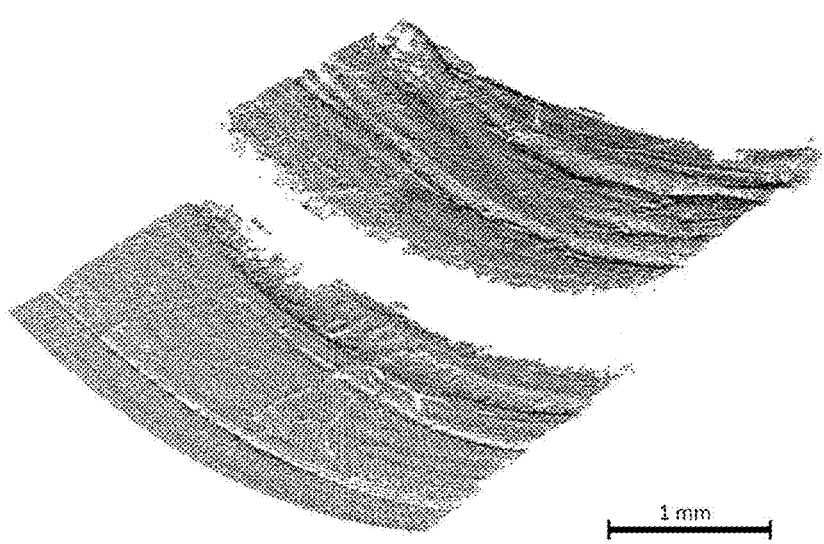
Figure 3:
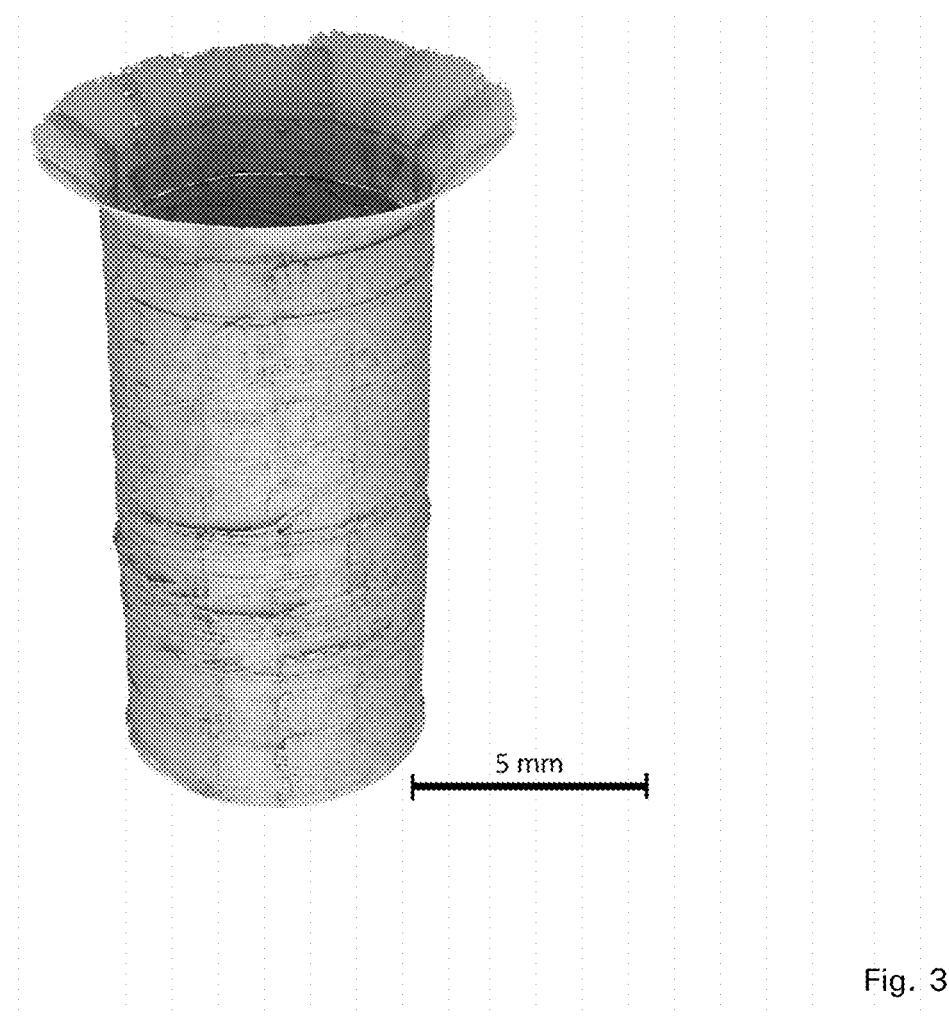

Possible embodiments of the method according to the invention will be explained in the following purely by way of example with reference to the following purely schematic figures. In the drawings:

FIG. 1 shows a cross section through a lance in a bore
FIG. 2 shows the image of the geometry of two diametrically opposed regions and FIG. 3 shows a representation of the geometry of a bore obtained from a plurality of overlapping regions with a depression.

FIG. 1 shows a cross section through a lance in a bore with a depression. The lance is designed as a round tube closed at the end with two diametrically opposed outlet openings. In the region of the outlet openings, a glass body which is triangular in cross section is arranged on the base of the lance and is coated in a reflective manner on its surfaces shaped like a gabled roof. It forms a beam splitter. A light beam falling through the lance, which is divided and deflected by the beam splitter, is also indicated by dashed lines. In order to illustrate this division also in the light beam falling from above through the lance, two dashed lines were also provided here. The deflected light beam parts each illuminate a region of the wall. If the lance is now rotated slightly after the area has been received, and a new receptacle is produced, it is possible to achieve an image extending over the entire circumference of the bore through corresponding repetitions of the process, which can be obtained by correspondingly overlapping regions. In addition, the lance can then also be pushed further into the hole or pulled out of the latter, and a further, preferably overlapping segment can be obtained by a plurality of receptacles as tell as temporary rotation.

FIG. 2 shows the illustration of two simultaneously imaged regions of the bore of FIG. 1. Their arrangement does not correspond to the arrangement in the bore. However, this can be reconstructed. They are shown, so to speak, split open next to each other.

A corresponding reconstruction based on a plurality of overlapping regions is shown in FIG. 3. In this case, the bore was shown "from the outside", as it were, going out from the workpiece, and from above. The acquired point cloud was shown for illustration. The boundary layer between the workpiece and the bore is shown, so to speak. Partially spiral depressions can be seen in the wall of the bore, which can arise, for example, through a bore with a rotating and advancing drill.

The invention claimed is:

1. A method for examining or measuring at least one wall portion of a depression introduced into a workpiece by means of an optical measurement method, wherein at least one light beam is introduced along a first axis into the depression and wherein the geometry or reflectivity of the at least one wall portion is measured by means of the at least one light beam, wherein the at least one light beam is deflected in the depression in such a way that at least two regions of the at least one wall portion are illuminated simultaneously and that from each wall portion reflected light is guided along the first axis out of the depression through the at least two regions and is used outside the depression for determining the geometry or reflectivity of the at least one wall portion, wherein the determination of the geometry or reflectivity is carried out interferometrically or in that at least one distance value or at least one intensity value or reflectivity value is detected in each region of the at least two regions for at least 1,000 pixels of a sensor array, wherein the pixels have a 2- or 3-dimensional arrangement;

or wherein the regions or the at least one light beam each have an area of at least 0.1 mm$^2$; and wherein the measurement is carried out for a plurality of regions, and wherein the at least two regions illuminated simultaneously are disjointed.

2. The method according to claim 1, wherein the at least two regions each have an area in the range of at least 2 mm² or up to a maximum of 50 mm².

3. The method according to claim 1, wherein the determination of the geometry or reflectivity is carried out simultaneously and wherein the respective simultaneously illuminated areas each intersect a common plane perpendicular to the first axis.

4. The method according to claim 1, wherein the at least one wall portion is a size in the range of at least 25 mm² or maximum 100 cm².

5. The method according to claim 1, wherein the depression has a size or diameter in the range from 4 mm to 25 mm or the depression or the at least one wall section has a depth in the range of at least 2 mm or at most 1 m.

6. The method according to claim 1, carried out such that, per region, at most 50,000 pixels are detected, the pixels having the 2- or 3-dimensional arrangement or being uniformly distributed over the region or the region's projection onto a plane in which the first axis is located, or at least five pixels are recorded in the direction of the first axis or the recorded pixels span at least 0.5 µm per area in the direction of the first axis.

7. The method according to claim 1, wherein a material type, roughness, or color derived from the reflectivity or at least one material type or color difference or at least one boundary is detected based on different reflectivity values.

8. The method according to claim 1, wherein all regions of the plurality of regions adjacent to one another overlap and wherein reflectance images of the overlapping regions are set together to form a continuous reflectivity mapping or the geometries of the overlapping regions are set together to form a cohesive geometry.

9. The method according to claim 1, wherein the at least two regions in a plane perpendicular to the first axis are arranged such that at least one connecting line from a first to a second one of the at least two regions passes through the first axis.

10. The method according to claim 1, wherein a beam splitter is moved along the first axis or rotates about the first axis and thereby different regions of the at least two regions in the depression are illuminated by the at least one light beam.

11. The method according to claim 1, wherein a centering of the first axis in the depression is effected based on the specific geometry of the at least one wall section.

12. A device for examining or measuring at least one wall portion of a depression introduced into a workpiece by means of an optical measurement method, wherein the device introduces at least one light beam into the depression through a lance, and wherein the device measures by means of the at least one light beam the geometry or reflectivity of the at least one wall portion, wherein the device is designed such that for each circumferential region in the direction of a longitudinal extension of the lance at least five adjacent pixels are detected by a sensor array of the device or pixels detected in the direction of the longitudinal extension of the lance correspond to at least 0.1 µm on the circumferential region of the lance by the sensor array of the device, wherein the device rotates the lance about the longitudinal extension of the lance or moves the lance along the longitudinal extension of the lance;
wherein the lance has at least one beam splitter which is arranged and configured to deflect the at least one light beam in such a way that the at least one light beam exits from the lance in a plurality of adjacent planes perpendicular to the longitudinal extension of the lance, and that the device is configured to guide light which has emerged and reflected back at the at least two regions through the lance and out of the lance, and to use the light outside the lance for determining the geometry or reflectivity of the at least one wall portion, wherein the device is configured to detect at least one distance value or at least one intensity or reflectivity value via each of at least two peripheral regions for at least 1,000 pixels in which the pixels have a 2- or 3-dimensional arrangement, or wherein the at least two peripheral regions each span at least 0.1 mm, or have at least an extent of five pixels or at least 0.5 µm and wherein the device is configured to determine the geometry or reflectivity interferometrically;
wherein the at least one light beam is deflected in the depression in such a way that at least two regions of the at least one wall portion are illuminated simultaneously; and
wherein the at least two regions illuminated simultaneously are disjointed.

13. A use of a beam splitter for examining or measuring at least one wall section of a depression introduced into a workpiece by means of an optical measurement method, wherein the beam splitter is configured to divide an incident light beam into at least two beams which have at least 1 mm² of cross-sectional area; wherein the light beam is deflected in the depression in such a way that at least two regions of the at least one wall section are illuminated simultaneously; wherein a determination of the geometry or reflectivity is carried out interferometrically or in that at least one distance value or at least one intensity value or reflectivity value is detected in each region of the at least two regions for at least 1,000 pixels of a sensor array, wherein the pixels have a 2- or 3-dimensional arrangement; and wherein the at least two regions illuminated simultaneously are disjointed.

14. The use according to claim 13, wherein the beam splitter is arranged on a hollow measuring lance and the lance is rotated about its longitudinal axis or the lance is moved along its longitudinal axis.

15. The use according to claim 14, wherein the examination or measurement of the at least one wall section is carried out by examining or measuring a plurality of overlapping regions of the at least one wall section, which each are completely illuminated by the light beam at a time or wherein surfaces of the wall section covered by at least two regions are illuminated, examined or measured at least twice in succession, and a data set of the examination or measurement of the at least one wall section is generated.

* * * * *